Patented Feb. 26, 1946

2,395,523

UNITED STATES PATENT OFFICE 2,395,523

CONTROLLED OXIDATION OF BRANCHED CHAIN ORGANIC COMPOUNDS

William E. Vaughan and Frederick F. Rust, Berkeley, Calif., assignors to Shell Development Company, San Francisco, Calif., a corporation of Delaware No Drawing. Application January 30, 1943, Serial No. 474,224

8 Claims. (Cl. 260—610)

The present invention relates to the treatment of branched chain organic compounds, and more particularly pertains to the production of certain compounds, some of which are novel, by the controlled, nonexplosive oxidation of certain organic compounds, and especially of hydrocarbons containing at least one tertiary carbon atom of aliphatic character. In one of its more specific embodiments the present invention is directed to the controlled catalytic oxidation of saturated aliphatic hydrocarbons containing at least one tertiary carbon atom to produce high yields of novel di(tertiary alkyl) peroxides, particularly symmetrical di(tertiary alkyl) peroxides, as well as of tertiary alkyl hydro-peroxides and the corresponding alcohols. The organic hydro-peroxides and alcohols produced in accordance with the process of this invention have the same number of carbon atoms per molecule as the starting organic material treated, while each molecule of the novel di(tertiary alkyl) peroxides contains twice the number of carbon atoms as present in each molecule of the treated organic material.

The oxidation of various hydrocarbons has been effected for a number of years both non-catalytically and in the presence of various catalysts. As a general rule, most if not all of these oxidations resulted in considerable decomposition of the hydrocarbons, i. e. cleavage of carbon-to-carbon bonds of the organic starting material. Also, the products of reaction of such oxidations contained various percentages of hydrocarbons which have been oxidized to a greater or lesser extent. For instance, the catalytic oxidation of paraffinic hydrocarbons in accordance with the teachings of the prior art formed mixtures containing various percentages of carbon monoxide, carbon dioxide, olefins, water, as well as some aldehydes, alcohols, acids, acetals, esters, ketones and other hydrocarbon-oxygen compounds. Similarly, the catalytic oxidation of aromatic hydrocarbons, e. g. toluene, in accordance with the teachings of the prior art frequently formed mixtures containing various percentages of saturated and unsaturated hydrocarbons, saturated and unsaturated aliphatic and aromatic aldehydes, ketones, lactones, alcohols and other oxygenated compounds such as carbon dioxide. Furthermore, these various oxygenated compounds formed during the oxidation of various hydrocarbons according to the teachings of the prior art usually contained varied numbers of carbon atoms per molecule due to the carbon-to-carbon bond scission, as well as to other side reactions such as polymerization, condensation and the like. Although most of the oxygenated organic compounds formed as a result of partial oxidations of hydrocarbons are generally more valuable than the primary materials subjected to the oxidation reaction, the subsequent fractionations of the reaction mixtures and the separate recovery of the individual compounds therefrom are frequently very difficult, if not commercially impossible, or at least greatly increase the cost of the final product or products.

It is also frequently desirable to obtain predominantly carboxylic acids, organic peroxides (including organic hydro-peroxides), alcohols, and/or ketones rather than mixtures containing them and large amounts of other oxygenated compounds, e. g. carbon dioxide, carbon monoxide, aldehydes, lactones, and the like. Furthermore, it is usually important or desirable to obtain such oxygenated compounds having at least the same number of carbon atoms per molecule as the starting organic material. In all such cases the known methods of partial oxidation of hydrocarbons, whether they be catalytic or non-catalytic, are impractical because of the partial or complete decomposition of the starting organic materials to form carbon and compounds containing fewer carbon atoms per molecule, as well as due to the formation of mixtures of compounds which are oxygenated to a greater or lesser degree.

It is therefore the main object of the present invention to avoid the above and other defects, and to provide a novel process whereby high yields of predetermined oxygenated organic compounds, some of which are novel, may be obtained. A further object of the invention is to provide a process for the production of high yields of certain organic peroxides and alcohols to the substantial exclusion of other oxygenated organic compounds. A still further object is to provide a process whereby organic compounds containing a tertiary carbon atom of aliphatic character may be oxidized to produce predominantly the corresponding alcohols and organic hydro-peroxides having the same number of carbon atoms per molecule as the starting material, as well as a novel class of organic peroxides the molecules of which have twice the number of carbon atoms as the starting material, to the substantial exclusion of other products of oxidation which are normally formed when various organic compounds, such as hydrocarbons, are subjected to oxidation in accordance with the processes of the prior art. Another object is to provide a novel process for the controlled catalytic oxidation of hydrocarbons, and particularly of saturated aliphatic hydrocarbons containing at least one tertiary carbon atom, to produce valuable and novel organic peroxides, such as di(tertiary alkyl) peroxides, to the substantial exclusion of oxygenated compounds having a lesser number of carbon atoms per molecule than present in the organic compound subjected to treatment. Still other objects of the present invention will become apparent from the following description.

It has now been discovered that the above and other objects may be attained by effecting the partial and controlled oxidation in the presence of a catalyst comprising or consisting of hydrogen bromide. More specifically stated, the invention resides in the controlled non-explosive oxidation of hydrocarbons containing at least one tertiary carbon atom of aliphatic character in the presence of hydrogen bromide, or of a compound capable of yielding hydrogen bromide under the operating conditions. In one of its more specific embodiments the invention resides in the production of certain oxygenated organic compounds, including certain novel organic peroxides, such as di(tertiary alkyl) peroxides, this being effected by subjecting the above-mentioned and hereinbelow more fully described class of compounds containing a tertiary carbon atom of aliphatic character to the action of oxygen or of an oxygen-containing or oxygen-yielding material, in the presence of hydrogen bromide or of a substance capable of yielding hydrogen bromide under the operating conditions, and at temperatures and pressures which are below those capable of causing spontaneous combustion and therefore the resultant decomposition of the carbon structure of the starting organic material.

The above-outlined invention is predicated on the discovery that the presence of hydrogen bromide, during the oxidation of the defined class of organic compounds controls the oxidation reaction so that the oxidation occurs on the carbon atom or atoms to which a halogen atom would normally attach itself if the starting organic material were subjected to a halo-substitution reaction. Furthermore, it has been found that the presence of hydrogen bromide, besides retarding the explosion or complete combustion of the organic starting material, has the effect of inhibiting decomposition of the carbon structure of such starting materials, so that the resultant oxygenated compounds contain at least the same number of carbon atoms per molecule as the starting organic material.

As stated, the organic compounds which may be oxidized in accordance with the process of the present invention contain a tertiary carbon atom of aliphatic character, and may therefore be generally represented by the formula

wherein each R represents a like or different alkyl, aryl, aralkyl, alicyclic or heterocyclic radical, two of which together may form an alicyclic ring compound, and which radicals may be further substituted, for instance, by the presence of one or more halogen, nitrogen or oxygen atoms which are attached to one or more of the carbon atoms of such radicals. The preferred class of organic compounds which may be used as the starting material comprises the saturated aliphatic hydrocarbons containing at least one tertiary carbon atom, as well as their halo-substituted derivatives in which the halogen atom or atoms are attached to any one or more of the carbon atoms of the various alkyl radicals attached to the tertiary carbon atom which latter carries a replaceable hydrogen atom. The following is a non-limiting representative list of saturated aliphatic hydrocarbons (containing at least one tertiary carbon atom) which may be oxidized according to the process of the invention: isobutane, 2-methyl butane, 2-ethyl butane, 2-methyl pentane, 3-methyl pentane, 2,3-dimethyl butane, 2,4-dimethyl butane, and their homologues, as well as their halogenated derivatives in which the halogen atom or atoms are attached to the primary or secondary carbon atoms so that the tertiary carbon atom or atoms contain a replaceable hydrogen atom. The following are examples of such halogenated derivatives: 1-halo-2-methyl propane, 1-halo-2-ethyl propane, 1-halo-2-methyl butane, 1-halo-3-methyl butane, 2-halo-3-methyl butane, and the like, and their homologues. Also, one or more of the aliphatic radicals attached to the tertiary carbon atom may be substituted by an aryl or aralkyl radical. As examples of such compounds reference may be made to isopropyl benzene, 1-phenyl-1-methyl propane, 1-phenyl-2-methyl propane, and the like. Instead of employing individual members of the above-mentioned class of organic compounds containing at least one tertiary carbon atom of aliphatic character, the present process is also applicable, at least in some instances, to the controlled oxidation of mixtures of compounds of this class, as well as mixtures containing one or more of the organic compounds of the above-defined class together with one or more other organic compounds. For example, under certain conditions and particularly where it may be desirable to produce asymmetrical organic peroxides, as for example where one of the radicals attached to the peroxy (—O—O—) radical is a tertiary alkyl radical, while the other is a secondary alkyl radical, this starting material should consist of a mixture of the corresponding tertiary and secondary hydrocarbons.

It was stated above that the slow (i. e. non-explosive) controlled oxidation of the above-outlined class of organic compounds is effected in accordance with the present invention at temperatures which are below those at which spontaneous combustion or substantial decomposition of the carbon structure occurs. This upper temperature limit will at least in part depend on the specific organic substance treated, as well as on the proportions thereof and of the oxygen and hydrogen bromide present in the vaporous mixture subjected to the elevated temperatures. Generally speaking, this upper temperature limit is in the neighborhood of about 200° C. However, some of the more stable organic compounds of the defined class may be heated together with oxygen and hydrogen bromide to higher temperatures, e. g. about 250° C., and higher, particularly in the presence of inert diluents, without causing the mixture to decompose with the concurrent formation of high yields of carbon. In this connection it is to be noted that excessively high temperatures, even though they may be below the explosive region, should be avoided because of certain undesirable side reactions such as excessive conversion of hydrogen bromide to organic bromides. This in itself is not detrimental because the organic bromides themselves may be treated in accordance with the present invention to form halogen-free oxygenated organic compounds and hydrogen bromide (so that in effect at least a portion of the hydrogen bromide is regenerated and may be reused). Nevertheless, the excessive formation of organic bromides during the controlled oxidation of a given organic compound, e. g. a saturated aliphatic hydrocarbon containing a tertiary carbon atom, is undesirable because this decreases the catalyst concentration and therefore may affect the yield or output of the desired oxygenated product or products. As stated, the upper temperature limit is generally in the neighborhood of about 200° C. However, with shorter contact periods this temperature may be raised above the mentioned limit. Nevertheless, some of the more readily oxidizable compounds may be economically oxidized according to the present process at lower temperatures, e. g. about 150° C., and lower. With a further decrease in the operating temperature the output of desired product per unit time will decrease so that at temperatures of below about 100° C. the controlled oxidation in the presence of the hydrogen bromide, or substances capable of yielding it under the operating conditions, may become uneconomical.

The reaction may be effected in the liquid or vapor phase, or in a two-phase liquid-vapor system. Since it is difficult to maintain a desirable relatively high oxygen concentration when the reaction is conducted in the liquid phase, it is generally preferable to effect the oxidation according to the present invention in the vapor phase. Since some of the relatively higher boiling hydrocarbons containing a tertiary carbon atom of aliphatic character, which hydrocarbons may or may not contain halogenated substituents, cannot be effectively maintained in the vapor phase and in contact with sufficient concentrations of oxygen and of hydrogen bromide without causing spontaneous combustion, the oxidation of such compounds may be readily effected in the presence of inert diluents such as steam, nitrogen, carbon dioxide, and even methane, which latter is relatively stable at temperatures at which other mentioned hydrocarbons, and their corresponding halogenated derivatives, may be oxidized according to the invention. Of the above diluents, the use of steam is believed to be most advantageous because the hydrogen bromide may then be removed from the reaction mixture as an overhead fraction in the form of its constant boiling mixture of hydrogen bromide and water.

Although the volumetric ratios of the organic starting material to the oxygen may vary within relatively wide limits, it may be stated that satisfactory yields of the desired oxygenated product or products, such as the novel di(tertiary alkyl) peroxides described more fully hereinbelow, can be obtained by using equivolumetric quantities thereof. An increase in the ratio of oxygen to the organic material in the treated mixture may increase the yield of the desired organic peroxides (including the organic hydro-peroxides) as well as of alcohols containing the same number of carbon atoms per molecule as the treated organic compound. Any undue increase in this ratio is generally dangerous because of excessive explosion hazards. On the other hand, the use of oxygen-to-hydrocarbon ratios which are considerably below equivolumetric will lower the output of the desired product or products per unit of time because of the presence of less oxygen per unit of space. This renders the process less economical. However, the process is still operable, and, in fact, it must be noted that a lowering of the oxygen-to-hydrocarbon or oxygen-to-organic compound ratio may cause a more rapid consumption of oxygen per unit of time. It was stated above that satisfactory yields of the desired oxygenated products may be obtained when equivolumetric mixtures of oxygen and of the specified organic starting material are subjected to the action of hydrogen bromide at the operating temperatures specified herein. Such mixtures usually present no hazards in so far as explosions are concerned, the hydrogen bromide apparently acting as an explosion retardant or inhibitor.

The amount of hydrogen bromide employed as the catalyst may also vary within relatively wide limits, although optimum amounts or percentages may be readily determined for each individual starting material treated and for the specific operating conditions employed. Generally speaking, the percentage of oxygen which will react to form the oxygenated products will vary with the change in the hydrogen bromide concentration in the mixture subjected to treatment. When the hydrogen halide, i. e. hydrogen bromide, concentration is varied from zero to about 20 percent (of the total vaporous mixture present in the reaction zone) there is a proportional and noticeable change in the percentage of oxygen which reacts with the organic starting material. Increases in the volumetric or mol concentration of the hydrogen bromide above about 20%, however, do not have such a marked effect on the percentage of oxygen which will react. Nevertheless, very high hydrogen bromide concentrations will cause excessive dilution and thus decrease the output of the desired product or products. Such high concentrations should therefore be avoided for economic reasons.

The oxidation in accordance with the present process may be effected at atmospheric pressures, although higher or lower pressures may also be employed. In fact, it is generally preferable to employ superatmospheric pressures because more of the mixture subjected to treatment may be conveyed through a given unit of reaction space per unit of time.

The invention may be executed in a batch, intermittent or continuous manner. When operating in a continuous system, all of the reactants, as well as the diluents, if diluents are used, and the catalyst may be first mixed together, and the mixture may then be conveyed through the whole length of the reaction zone. In the alternative, it is possible to introduce at least a portion of the catalyst and/or of one or both of the reactants, i. e. oxygen and the organic material subjected to oxidation, at various intermediate points along the reaction zone. Such operation may be frequently desirable to control the operating conditions in the reaction zone. Generally, the contact time may vary within relatively wide limits and is at least in part dependent on the other operating conditions such as specific starting material, the ratios thereof to the oxygen and/or the catalyst, the presence or absence of inert diluents, the operating temperatures and pressures, etc. In a continuous system it has been found that satisfactory yields of the desired organic peroxides and/or of other oxygenated products may be obtained with contact periods of between about one and about three minutes.

Nevertheless, shorter or longer contact times may also be employed.

Instead of using pure or substantially pure oxygen for the oxidation in accordance with the process of the present invention it is also possible to employ oxygen-containing mixtures such as air, or even substances capable of yielding molecular oxygen under the operating conditions. Also, although the example presented hereinbelow is directed specifically to the use of hydrogen bromide as the catalyst, the process of the present invention may also be realized by using substances capable of yielding hydrogen bromides under the operating conditions employed.

The controlled oxidation of organic compounds containing a tertiary carbon atom of aliphatic character, when such oxidation is effected in accordance with the process of the present invention, results in the formation of organic alcohols and organic hydro-peroxides having the same number of carbon atoms per molecule as the starting organic compound, as well as of a novel class of compounds, and more specifically of a certain novel and valuable class of organic peroxides which may be valuable per se or useful in various chemical reactions and/or syntheses. This new class of compounds may be generally represented by the formula

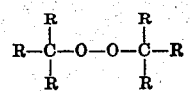

wherein each R represents a like or different alkyl radical which may or may not be further substituted. A particularly useful group of novel compounds which may be prepared according to the present process comprises di(tertiary alkyl) peroxides of the above general formula wherein each R represents a like or different saturated alkyl radical. A particular sub-group comprises the symmetrical saturated di(tertiary alkyl) peroxides. A specific example of this sub-group of novel compounds is di(tertiary butyl) peroxide, which, as will be shown, is formed by a controlled non-explosive oxidation of isobutane with oxygen in the presence of hydrogen bromide, at an elevated temperature which is however below the temperature at which spontaneous combustion of the mixture occurs. This new compound is a water-white, water-immiscible liquid, having a pleasant odor, and boiling at about 108° C. to 110° C. It has a specific gravity of about 0.796 at 20° C., and a refractive index $N_D^{20}$ of about 1.3893. This peroxide is unaffected when washed with 65% sulfuric acid, and reacts quantitatively with concentrated hydrogen iodide solution, when heated to about 60° C. for one hour in acetic acid solution, to yield one mol of iodine per mol of the peroxide. When ignited, it does not explode, but burns with a sooty flame. As compared to the known peroxides, this novel di(tertiary butyl) peroxide is surprisingly stable: it does not explode even when dropped onto a hot plate maintained at about 250° C. The properties possessed by this new compound, as well as by the whole class of these novel organic peroxides, adapt them admirably for use in organic reactions, as well as for other purposes. For example, these peroxides may be employed as catalysts for various chemical reactions, e. g. formations of plastics of the type of diallylphthalate and/or acrylate resins. Also, they may be used as additives to improve the cetane value of Diesel engine fuels.

The following example will further illustrate the various phases of the present invention, it being understood that the invention is not restricted to this example, but is co-extensive in scope with the appended claims.

Example

The reactor consisted of a coil of glass tubing having an internal diameter of 25 cm. This coil had a volume equal to 2940 cc. and was immersed in an oil bath which permitted accurate control of the reaction temperature. A preheated vaporous mixture of isobutane, oxygen and hydrogen bromide, which substances were used in a volumetric ratio of 2:2:1, was then conveyed through the reactor at substantially atmospheric pressure, at a temperature of about 158° C., and at such a rate that the residence time was equal to about 3 minutes. The reaction products were conveyed through water to separate the water-soluble compounds from the water-insoluble phase. The latter, after further washing with water, was then washed with a 2 N solution of sodium hydroxide (to destroy any and all traces of bromoketones, e. g. bromo-acetone, which may be present), and, after a further water wash and a drying with sodium sulfate, was subjected to distillation to separate an overhead fraction consisting of di(tertiary butyl) peroxide from the small amount of higher boiling bromides. The water-soluble phase was found to contain tertiary butyl alcohol and a minor amount of isobutyric aldehyde, as well as traces of other oxygenated compounds.

It was found that 87% of the introduced oxygen reacted to form oxygenated products. Of the total isobutane introduced, 42% appeared as di(tertiary butyl) peroxide, 39% as tertiary butyl alcohol, 7% as isobutyric aldehyde, 7% as unreacted isobutane, and about 5% as other oxygenated compounds, such as tertiary butyl hydroperoxide and traces of acetone and bromo-acetone.

When an equivolumetric gaseous mixture of isobutane and oxygen is subjected to the same operating conditions in the absence of a hydrogen halide, e. g. hydrogen bromide, catalyst, no reaction occurs until the temperature is raised far in excess of that employed above. Even then, after very long induction periods, the reaction products predominate in carbon monoxide, carbon dioxide, olefins and water, and contain only relatively small amounts of more or less oxygenated compounds, most of which contain less than four carbon atoms per molecule. Also, no di(tertiary butyl) peroxide is formed.

The above-described process is applicable to the non-explosive, catalytic oxidation of other organic compounds containing a tertiary carbon atom of aliphatic character to produce other novel organic peroxides of the class defined above. For example, the catalytic oxidation of isopentane (2-methyl butane) will yield di(tertiary amyl) peroxide. Similarly, it is possible to oxidize organic compounds containing, for example, two tertiary carbon atoms of aliphatic character. Also, novel asymmetric organic peroxides of the above-defined class, such as asymmetric di(tertiary alkyl) peroxides, may be formed in accordance with the process of the present invention by employing mixtures of hydrocarbons which may or may not contain an aliphatic tertiary carbon.

We claim as our invention:

1. A process for the production of di(tertiary butyl) peroxide and of tertiary butyl alcohol which comprises reacting substantially equivolumetric vaporous amounts of isobutane and oxygen, at substantially atmospheric pressure and at a temperature of between about 150° C. and 200° C., in the presence of hydrogen bromide employed in a volumetric amount equal to about one half that of the isobutane, effecting the reaction for a period of time sufficient to effect a substantially quantitative reaction of the oxygen employed, separating the reaction mixture into water-soluble and water-insoluble phases, recovering tertiary butyl alcohol from the water-soluble phase, and separately recovering di(tertiary butyl) peroxide from the water-insoluble phase.

2. A process for the production of di(tertiary butyl) peroxide and of tertiary butyl alcohol which comprises reacting substantially equivolumetric amounts of isobutane and oxygen in the vapor state, in the presence of hydrogen bromide employed in an amount in excess of about 20 mol per cent of the total vaporous mixture, at a temperature of between about 150° C. and about 200° C., effecting the reaction for a period of time sufficient to cause the controlled catalytic oxidation of the isobutane, and separately recovering di(tertiary butyl) peroxide and tertiary butyl alcohol from the reaction mixture thus formed.

3. A process for the production of di(tertiary butyl) peroxide which comprises reacting a vaporous mixture containing isobutane and oxygen, at a temperature of between about 100° C. and the temperature at which spontaneous combustion of the mixture occurs, and in the presence of hydrogen bromide, effecting said reaction for a period of time sufficient to cause the controlled catalytic oxidation of isobutane, and recovering the di(tertiary butyl) peroxide from the reaction mixture thus formed.

4. A process for the production of di(tertiary butyl) peroxide which comprises reacting a vaporous mixture containing isobutane and oxygen in the presence of hydrogen bromide at an elevated temperature which is below the spontaneous combustion temperature of the mixture, effecting said reaction for a period of time sufficient to cause the controlled catalytic oxidation of isobutane, and recovering di(tertiary butyl) peroxide from the reaction mixture thus formed.

5. A process for the production of symmetrical di(tertiary alkyl) peroxides which comprises reacting a vaporous mixture comprising oxygen and a saturated aliphatic hydrocarbon containing a tertiary carbon atom in the presence of hydrogen bromide at an elevated temperature which is below the spontaneous combustion temperature of the mixture, effecting said reaction for a period of time sufficient to cause the controlled catalytic oxidation of the hydrocarbon employed, and recovering the symmetrical di(tertiary alkyl) peroxide from the resultant mixture.

6. The process according to claim 5 wherein an inert diluent is employed as a carrier to maintain the reactants in the vapor state.

7. In a process for the production of di(tertiary alkyl) peroxides, the steps of subjecting vapors of a saturated aliphatic hydrocarbon containing at least one tertiary carbon atom to the action of oxygen in the presence of hydrogen bromide, and effecting the reaction at a temperature of between about 100° C. and the temperature at which spontaneous combustion of the mixture occurs.

8. In a process for the production of organic peroxides, the steps of subjecting a hydrocarbon containing at least one tertiary carbon atom of aliphatic character to the action of oxygen in the presence of hydrogen bromide, and effecting the reaction at an elevated temperature which is below that at which spontaneous combustion of the mixture occurs.

WILLIAM E. VAUGHAN.
FREDERICK F. RUST.